United States Patent [19]
Askeland et al.

[11] Patent Number: 5,158,150
[45] Date of Patent: Oct. 27, 1992

[54] HYDRAULIC WHEELCHAIR

[75] Inventors: Stanley C. Askeland, St. Louis Park, Minn.; Constantine Kosarzecki, Inverness, Ill.

[73] Assignee: Hydra-Powr, Inc., Minneapolis, Minn.

[21] Appl. No.: 826,270

[22] Filed: Jan. 24, 1992

Related U.S. Application Data

[63] Continuation of Ser. No. 708,111, May 28, 1991, abandoned, which is a continuation of Ser. No. 561,241, Jul. 27, 1990, abandoned, which is a continuation of Ser. No. 445,910, Dec. 4, 1989, abandoned, which is a continuation of Ser. No. 220,390, Jul. 12, 1988, abandoned, which is a continuation of Ser. No. 862,789, May 13, 1986, abandoned:

[51] Int. Cl.$^5$ .............................................. B60K 17/00
[52] U.S. Cl. ..................................... 180/305; 60/493; 180/307; 180/308; 180/907; 417/428
[58] Field of Search ............... 180/305, 307, 308, 907; 60/493; 417/428, 429, 468

[56] References Cited

U.S. PATENT DOCUMENTS

| | | | |
|---|---|---|---|
| 2,968,915 | 1/1961 | Feistel, Jr. | 417/428 |
| 3,913,453 | 10/1975 | Parquet | 60/493 |
| 4,118,149 | 10/1978 | Hagberg | 60/468 |
| 4,194,365 | 3/1980 | Stoufflet et al. | 60/494 |
| 4,244,184 | 1/1981 | Baldauf et al. | 180/307 |

FOREIGN PATENT DOCUMENTS

| | | | |
|---|---|---|---|
| 1920952 | 1/1970 | Fed. Rep. of Germany | 417/428 |
| 1901762 | 9/1970 | Fed. Rep. of Germany | 180/305 |
| 2457210 | 7/1975 | Fed. Rep. of Germany | 180/307 |

Primary Examiner—Eric D. Culbreth
Attorney, Agent, or Firm—Kinney & Lange

[57] ABSTRACT

A hydraulic system for powering a vehicle for human transportation. The output of a hydraulic pump is connected to at least one hydraulic motor by a hydraulic circuit, the motor(s) being mechanically connected to drive the vehicle. The hydraulic circuit establishes the direction of fluid flow through the motor(s). The pressure drop across at least a portion of the hydraulic circuit is monitored and the flow of fluid to the circuit is regulated accordingly.

9 Claims, 3 Drawing Sheets

HYDRAULIC WHEELCHAIR

This is a continuation of application Ser. No. 07/708,111 filed on May 28, 1991, which in turn is a continuation of application Ser. No. 07/561,241 filed on Jul. 27, 1990, which in turn is a continuation of application Ser. No. 07/445,910, filed Dec. 4, 1989 which in turn is a continuation of application Ser. No. 07/220,390, filed Jul. 12, 1988, which in turn is a continuation of application Ser. No. 06/862,789, filed May 13, 1986, all now abandoned.

BACKGROUND OF THE INVENTION

1. Field of the Invention

The present invention relates generally to battery powered vehicles for human transportation and, particularly, to hydraulic drive systems for wheelchairs.

2. Description of the Prior Art

Battery powered wheelchairs have enhanced the quality of life of persons of restricted mobility. Typically, such a vehicle is driven by a powered DC electric motor whose output is mechanically connected to the rear, or drive, wheels of the wheelchair. Batteries for powering the motor are stowed beneath the seat of the user while movement of the wheelchair is controlled by a joystick, or similar control device, mounted within the reach of the user, usually on or near an armrest. The movement of each drive wheel is independently controlled resulting in desired forward, reverse and/or turning motions of the wheelchair.

The running or operating time of battery powered wheelchairs is limited by the life of the batteries. Once a battery is drained of its useful voltage, it must be recharged, in known manner.

Other disadvantages of known electrically driven wheelchairs are their lack of smoothness in operation (particularly when the chair is being closely positioned relative to an article of furniture) and their inability to produce a significantly greater torque as the load increases. Hydraulic systems address both of these issues in that hydraulic controls provide a variable control function allowing a smoothness in operation, as during positioning, for example, while increasing loads will result, in a properly designed hydraulic system, in an increasing torque. However, prior hydraulic systems that are otherwise suitable to power a wheelchair do not address the question of power consumption. Also, such systems compound that problem through energy losses that must be dissipated as heat. The latter results from flow through portions of the system that is not required to meet an existing load condition.

SUMMARY OF THE INVENTION

The present invention provides a system for hydraulically powering a vehicle such as a wheelchair and, specifically, provides such a system wherein a hydraulic circuit is connected to control hydraulic fluid pumped by a hydraulic pump. The direction of flow through, and thus the direction of rotation of, a bidirectional motor is selectively controlled. The pressure drop across at least a portion of the circuit is sensed and the flow rate to the motor regulated such that excessive flow (i.e., beyond that required) is not delivered to the motor.

In a first preferred embodiment, separate power systems are provided for each vehicle wheel to be driven, with hydraulic fluid being selectively diverted from a driving hydraulic motor in accordance with the load requirements at that motor. A second preferred embodiment provides a similar fluid diversion while employing a single, dual-stage pump and powering multiple drive wheels. In a third preferred embodiment, multiple drive wheels are again powered from the flow of a single pump with that pump being a variable displacement pump responsive to a pressure drop within the hydraulic circuit that delivers fluid to the driving motors. Freewheeling systems are disclosed by which input and output connections to the driving motors are shunted to facilitate manual movement without having to overcome the entirety of the hydraulic circuits with which the motors are associated. A braking circuit is also disclosed which provides a hydraulic braking when delivery of the hydraulic fluid to the powering motors is discontinued.

DETAILED DESCRIPTION OF THE PREFERRED EMBODIMENTS

Figure 1:
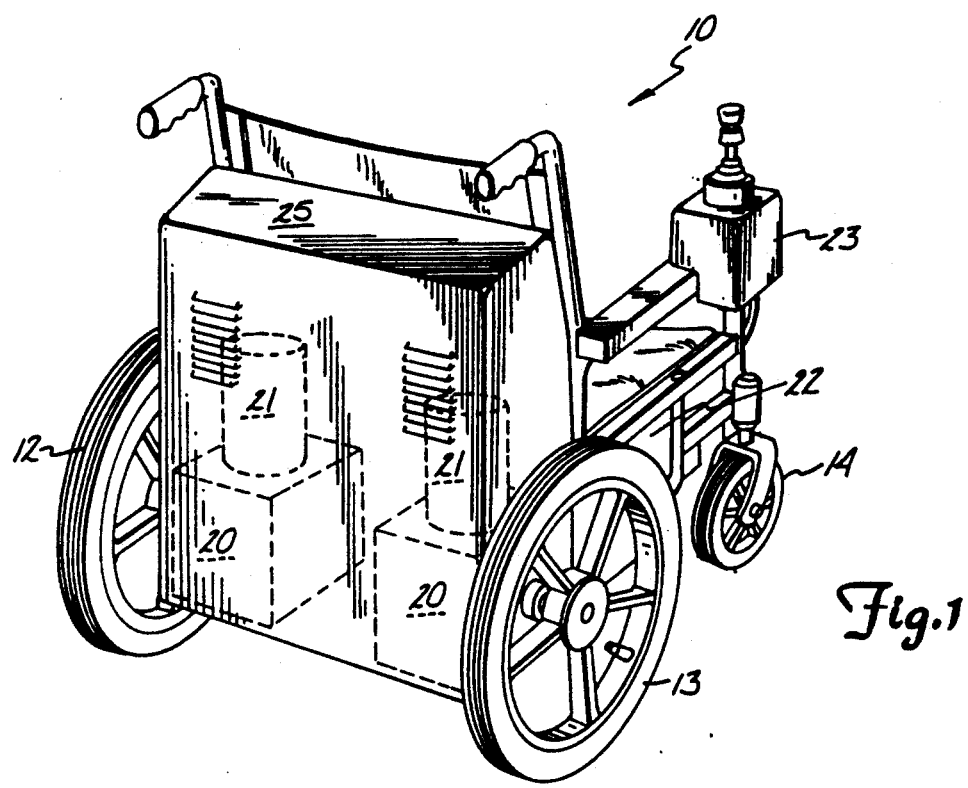
FIG. 1 is a perspective view of a wheelchair having a hydraulic powering system in accordance with the present invention.

A hydraulically driven wheelchair is illustrated in FIG. 1 and is indicated generally at 10. Throughout the figures, like reference numerals designate similar elements and components. The schematic symbols utilized in the figures conform to fluid power graphical standards established by the American National Standards Institute (ANSI).

The wheelchair 10 includes a frame with a seat formed of upholstered cushions or a sling, in known manner. The wheelchair 10 is supported on drive wheels 12 and 13 and on two forward casters 14 (one shown). A housing 25 is carried behind and below the seat portion of the wheelchair and houses a pair of hydraulic drive systems 20 each being driven by an electric motor 21. Hydraulic drives 20 are connected in any desired manner to drive the wheels 12 and 13, as by applying a torque to their axle, in known manner. Each motor 21 is powered by one or more batteries 22 which are stowed beneath the seat of the wheelchair. A joystick controller 23, of conventional design, is positioned on the armrest of the wheelchair for easy access.

It is to be understood that the representation of a wheelchair, as shown in FIG. 1, is illustrative only and will vary according to the particular implementation of the several embodiments of the present invention disclosed herein. Also, through the figures, electrical power connections are not shown but are conventional. Typically, the controller 23 will act on the controllable components described more fully below in the context of the preferred embodiments of FIGS. 2-4. Those controllable elements include electric motors, which are turned on and off, and controllable valves. The generation of appropriate control signals, as by controller 23, will be apparent to those familiar with the art as will their delivery, by appropriate connections, to the relevant components, particularly in light of the description of the function and operation that follows. Also, throughout the figures, dotted lines between elements or components, or between different parts of an element or component, indicate a line through which a pressure signal is passed. Although some flow of fluid may occur through such (dotted) lines, pressure transmission for control purposes is their primary function. Further, as is known within the noted standard for graphical representations, an arrow angularly disposed relative to a symbol indicates that the component can be adjusted or varied in a gradual manner.

Figure 2:
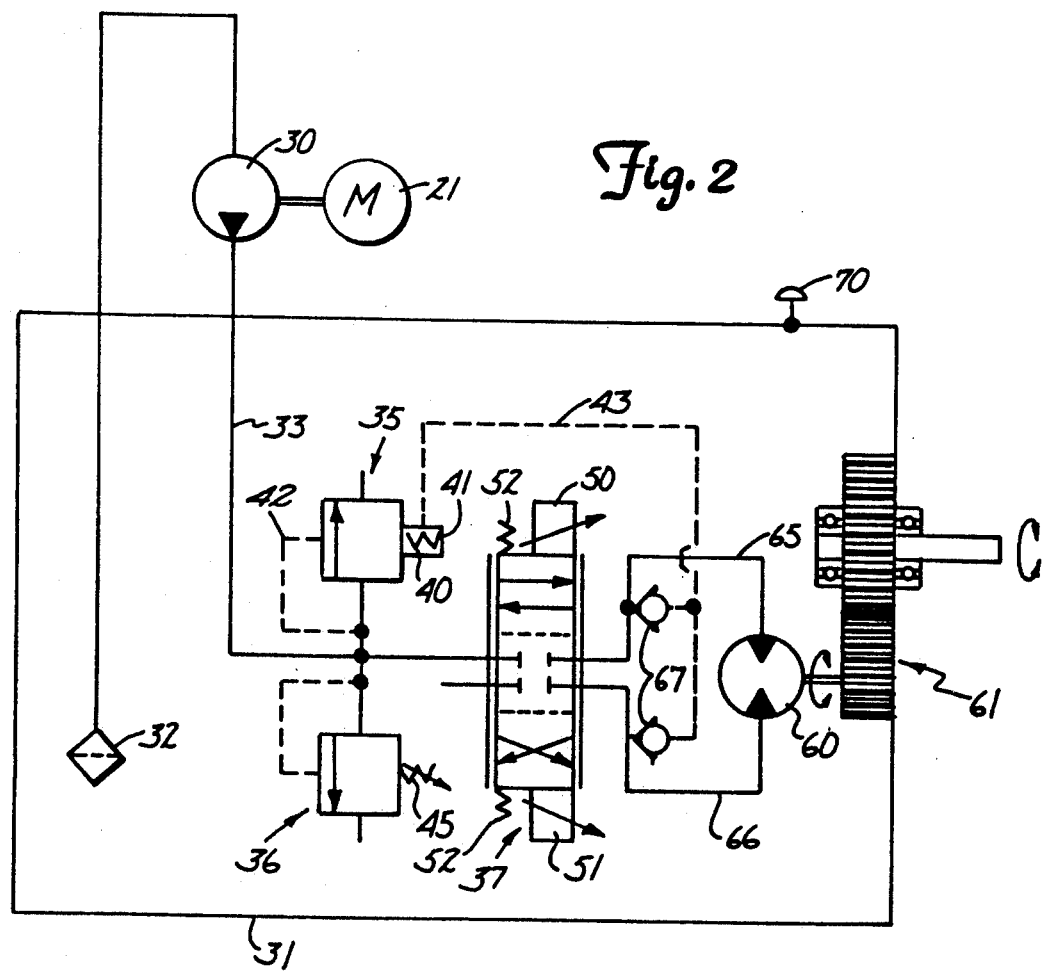
FIG. 2 illustrates an embodiment of a single wheel powering system in accordance with the present invention.

Referring now to FIG. 2, there is shown a hydraulic circuit for powering a wheelchair, and in particular a single wheel of such a vehicle. Typically, the embodiment of FIG. 2 will be employed in tandem to power both drive wheels 12 and 13 (see FIG. 1) of a wheelchair. A motor 21, which may be a DC motor, is connected to a supply of power such as the power supply batteries 22 of FIG. 1. The output shaft of the motor 21 is connected to a hydraulic pump 30 whose inlet is connected to a reservoir 31 via a filter 32. The pump 30 is a unidirectional, fixed displacement pump of known design and has its output connected to a line 33. The line 33 is connected to a compensator valve 35, pressure relief valve 36 and proportioning valve 37.

Compensator valve 35 is a normally closed valve that is maintained in the closed or flow blocking position by a spring 40 within a pressure chamber 41. The outlet of the valve 35 is connected to the reservoir 31 while a pressure sense line 42 connects the valve to its inlet pressure. A pressure sense line 43 is connected to the chamber 41 which contains the spring 40. A pressure on line 42 which is sufficient to overcome the combined forces of the spring 40 and the pressure in line 43 acting within the chamber 41, will cause the valve 35 to open with a greater pressure differential causing a greater valve opening and flow through the valve 35. The line 43 is described more fully below. The pressure relief valve 36 opens in response to a pressure differential in line 33 relative to a variable force established, in known manner, at adjustable spring 45 to relieve excess flow (at a predetermined pressure) within the line 33 by connecting the line 33 to the reservoir 31.

The proportional valve 50 is an infinite positioning, normally closed, four way valve that includes two proportioning solenoids 50 and 51 and centering springs 52. As is known from the graphic representation, an internal control spool is actuated by the solenoids 50 and 51 to control the flow rate and flow direction from the line 33 to a hydraulic motor 60. The hydraulic motor 60 is a bidirectional motor having its output connected to a gear reducer 61, the gear reducer 61 being suitably connected to drive a wheel or axle of the wheelchair or other vehicle.

As is known in the art, the proportional valve 37 includes four ports. The pressure port is connected to receive hydraulic fluid from the pump 30 via the line 33. The tank port returns fluid from the proportional valve 37 to the reservoir 31. The third and fourth ports deliver hydraulic fluid from the line 33 to the motor 60 and receive the return flow, via the lines 65 and 66. Sense check valves 67 connect the lines 65 and 66 to the pressure sense line 43.

As is known to those familiar with the art, signals appearing at the solenoids 50 and 51 will establish a flow from line 33 to one of the lines 65 and 66 and, thus, the rotational direction of the motor 60. A variable flow is established by the valve 37, still under the control of the solenoids 50 and 51, to establish the flow rate to the motor 60. In general terms, at a given flow rate, an increasing pressure will produce an increasing torque output by motor 60. Similarly, at a constant pressure an increasing flow rate will provide an increasing rotational speed in the motor 60. Thus, both torque and speed of the motor 60 may be controlled by controlling the flow rate and pressure in that one of the lines 65 and 66 that functions as the input to the motor 60. As noted above, selection of the line 65 or 66 as the input to the motor 60 is by control of the valve 37 while that same control (through control of the solenoids 50 and 51) establishes the flow rate through the valve 37.

In operation, and assuming that the motor 21 is running and the pump 30 pumping, hydraulic fluid is withdrawn from the reservoir 31 and fed through the line 33. Assuming that the valve 37 is activated to select one of the lines 65 or 66 as the input line to the motor 60, the motor 60 will be rotating at a speed established by the flow rate in the input one of the lines 65 or 66 and in accordance with the pressure in that line. A typical operating pressure for the output of pump 30 is 150-200 psi while the embodiment of FIG. 2 will be described in the context of maintaining a 40 psi pressure drop across the valve 37. Again assuming the stated operating conditions, the pressure in the input one of lines 65 and 66 will appear in the line 43 to be summed with the spring force of spring 40 within the chamber 41. Spring 40 is selected such that a pressure in line 43 that differs from the pressure in line 33 (and, accordingly, the pressure in line 42) by 40 psi or more will maintain the valve 35 closed.

Assuming that proportional valve 37 is fully open (as established by an appropriate control signal as from controller 23, for example), the valve 37 is merely directing flow into one of the lines 65 or 66 to establish the direction of rotation of motor 60. The pressure in line 33 and pressure sense line 43 (via that one of lines 65 and 66 and its associated check valve 67 that is connected to the output of valve 37) will differ only by pressure drops inherent in the system. In this condition, spring 40 will maintain the valve 35 closed and all flow will be directed from line 33 to the motor 60 and the powered wheelchair will be travelling at full speed. If a small hill is encountered, a higher torque is required. With no change in the position of the spool of valve 37, this higher torque requirement will be satisfied by an increasing pressure at the inlet to motor 60.

Relief valve 36 establishes the upper limit of the pressure in the system, via variable spring 45. This establishes an upper limit on the torque that the system can develop and, accordingly, sets a limit on the "steepness" of a hill that can be climbed. Of course, the pressure limit is set by design considerations of the system components, as opposed to an arbitrary torque limit on the system.

Pump 30 is a fixed displacement pump having a constant flow rate at its output. In the operating description of the embodiment of FIG. 2, to this point, the full output of pump 30 has been delivered to the motor 60. Now, however, should the operator desire to move at less than full speed, an appropriate control signal is generated (as via the controller 23 of FIG. 1) causing the spool of valve 37 to partially close (via solenoids 50,51) and reduce the flow rate to the motor 60. Accordingly, the pressure in line 33 will increase to act on valve 35, via pressure sense line 42, and against the combined forces of spring 40 and the pressure in pressure sense line 43. With sufficient pressure in line 42 (versus that in line 43, 40 psi in the example given) the valve 35 will begin to open and divert flow from the line 33 to the reservoir 31. This diversion will adjust to the desired operating speed of motor 60 through variable opening of the valve 35, at a lower pressure in line 33 than is required to open relief valve 36. As will be apparent to those familiar with the art, diversion, via valve 35, of a portion of the flow in line 33 will reduce the power loss within the system (and reduce the heat that must be dissipated) and, accordingly, will reduce the power requirements of the system. In this manner, the life of the battery or batteries powering motor 21 will be prolonged. Element 70 in FIG. 2 is a breather allowing for expansion of the fluid, in known manner.

As described to this point, the present invention provides a hydraulic circuit that connects the hydraulic motor to a supply of fluid and selects the rotational direction of that motor. The pressure drop within the circuit, or a portion of the circuit, is sensed and the flow rate to that portion of the circuit whose pressure drop is sensed is controlled.

Figure 3:
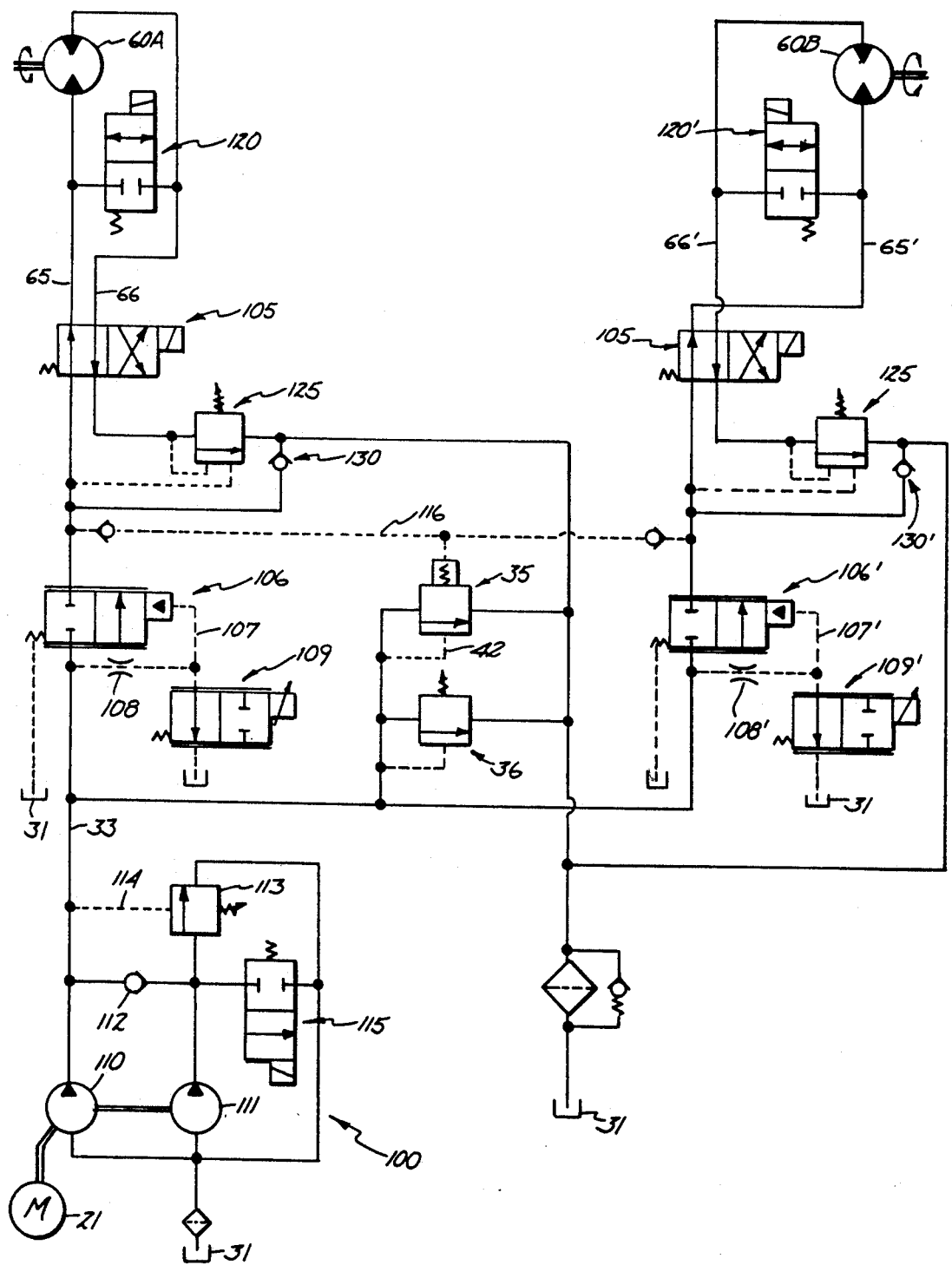
FIG. 3 illustrates a powering system for multiple wheels having a single, dual stage pumping system.

FIG. 3 illustrates a second preferred embodiment in accordance with the present invention incorporating many of the features and providing further operating advantages to the system shown in FIG. 2. In FIG. 3, two hydraulic motors 60A and 60B are each connected to drive a different wheel (such as the wheels 12 and 13 of FIG. 1) in any suitable and desired manner. Fluid flow to drive the motors 60A and 60B is provided by a pump system 100 whose output appears at line 33. The pump system 100 is described more fully below. The direction of flow through the motor 60A is established by a solenoid controlled valve 105 which is a two position valve selectively interconnecting the lines 65 and 66 as input or output lines to the motor 60A. The input to the valve 105 is connected to a valve 106 which is a normally closed (blocking), infinitely variable valve controlled by a pressure or pilot port. The pilot port of valve 106 is connected to the line 33 by a pressure sense line 107 whose flow is restricted by a flow restriction 108. The line 107 is also connected to the reservoir 31 through a normally open, infinitely variable, proportional, solenoid controlled valve 109. When the valve 109 is in the illustrated open position, pressure will not build up within the line 107 and the valve 106 will remain closed blocking flow to the valve 105 from the line 33. However, on the application of an appropriate control signal at the solenoid of valve 109 (as established by a suitable controller such as controller 23 of FIG. 1, for example) the valve 109 will begin to close allowing a pressure buildup in line 107. Increasing closing of the valve 109 will produce an increasing pressure in line 107 and an increasing opening of valve 106. The degree of opening of valve 106 establishes the flow rate of fluid from the line 33 to the valve 105 while the valve 105 establishes the direction of flow through the motor 60A. Thus, the valve 106, under the control of valve 109, and the valve 105 function in a manner similar to that of the proportional valve 37 of FIG. 2. A compensator valve 35 similar to the valve 35 of FIG. 2 senses the pressure drop across the valve 106 (via a pressure sense line 116 and associated check valves), to divert flow from the line 33 to the reservoir 31 as the orifice of valve 106 changes and the pressure in line 33 increases due to excess (or unused) flow. In the given example, this excess flow is diverted to the reservoir 31 at working pressure plus 40 psi as described in the embodiment of FIG. 2. Also, a pressure relief valve 36 is again provided. The control valves which form the hydraulic circuit for the motor 60B, and which correspond to the hydraulic circuitry associated with motor 60A described to this point, are designated by primed, like reference numerals. Valves 35 and 36 are common to the hydraulic circuits associated with the motors 60A and 60B.

The pump system 100 is a two stage pump consisting of a primary pump 110 and a secondary pump 111. The primary pump has its output directly connected to the line 33 while the output of the secondary pump 111 is connected to the line 33 through a check valve 112. An adjustable, pressure controlled valve 113 connects the output of the pump 111 to its input and is controlled by the pressure in line 33 via a line 114. The pressure in line 114 acts against an adjustable force established by a spring shown in conjunction with the valve 113.

In operation, the portion of the system of FIG. 3 described to this point will have the direction of the motors 60A and 60B established by an appropriate control signal applied to the valves 105, 105'. Signals on the valves 109, 109' will then establish a flow rate (assuming a flow in line 33) with that flow passing through the valves 105 and their associated motor. Assuming for the moment a direct connection between the valves 105 and the reservoir 31 (or valve 125, discussed below, is open), the motors 60A and 60B will rotate in the established direction (as established by the valves 105) and at a speed established by the flow rate through the valves 106. If the pressure drop across both of the valves 106 exceeds a preestablished limit, the valve 35 will begin to open to divert flow from the line 33 to the reservoir 31. Again, the flow rate through the valves 106 may be regulated by an appropriate control signal applied to the solenoid of the associated one of valves 109. Should the pressure in the line 33 begin to approach a limit established by the spring of valve 113, the valve 113 will begin to open diverting flow that is otherwise available at the output of pump 111 to its input. In this way, the output of the pump 111 may be shunted reducing the flow available to the motor 60A and 60B while maintaining the pressure available to those motors for the required torque. Normally closed and selectively operable valve 115 is provided to shunt the output of pump 111 to its input to selectively disconnect the pump 111 from the pumping system 100 of FIG. 3. In the embodiment illustrated in FIG. 3, the pressure line 116 (which acts to establish a pressure drop in cooperation with the valve 35) is connected so as to respond to a pressure drop across both of the valves 106.

In some situations, it may be desirable to manually push a wheelchair that is otherwise arranged for hydraulic powering. Valves 120 are provided for this purpose. Valves 120 are normally closed and selectively operable (by a control signal applied to their solenoid) to effectively connect the input and outputs of the motors 60A and 60B to each other. In this way, while the motors 60A and 60B may be directly connected to a drive train, activation of the valves 120 will disconnect the motors 60A and 60B from the hydraulic circuitry meaning that fluid need only be circulated through the motors and the valves 120. This establishes a freewheeling situation. Further, it may be desirable to provide an automatic braking within a powered wheelchair. The valves 125 are provided for this purpose. The valves 125 are normally closed, variable valves having pressure ports connected to the input and output lines of a valve 105. Thus, a pressure on either the input or output lines leading to the motor 60A sufficient to overcome the variable force of the valves 125 will cause those valves to open during normal (powered) operation of the wheelchair. However, in the event that pressure is relieved in both of those lines, as on removal of all control signals indicating no desired movement of the chair, the valves 125 will close to reduce and, eventually, prevent further passage of fluid. In this manner, a breaking action against further rotation of the motors 60A and 60B is provided. Check valves 130 are provided as anticavitation devices to prevent the formation of air pockets, particularly at low pressures, and are connected to permit flow to the input of motors 60 when proper pressure conditions are present.

Figure 4:
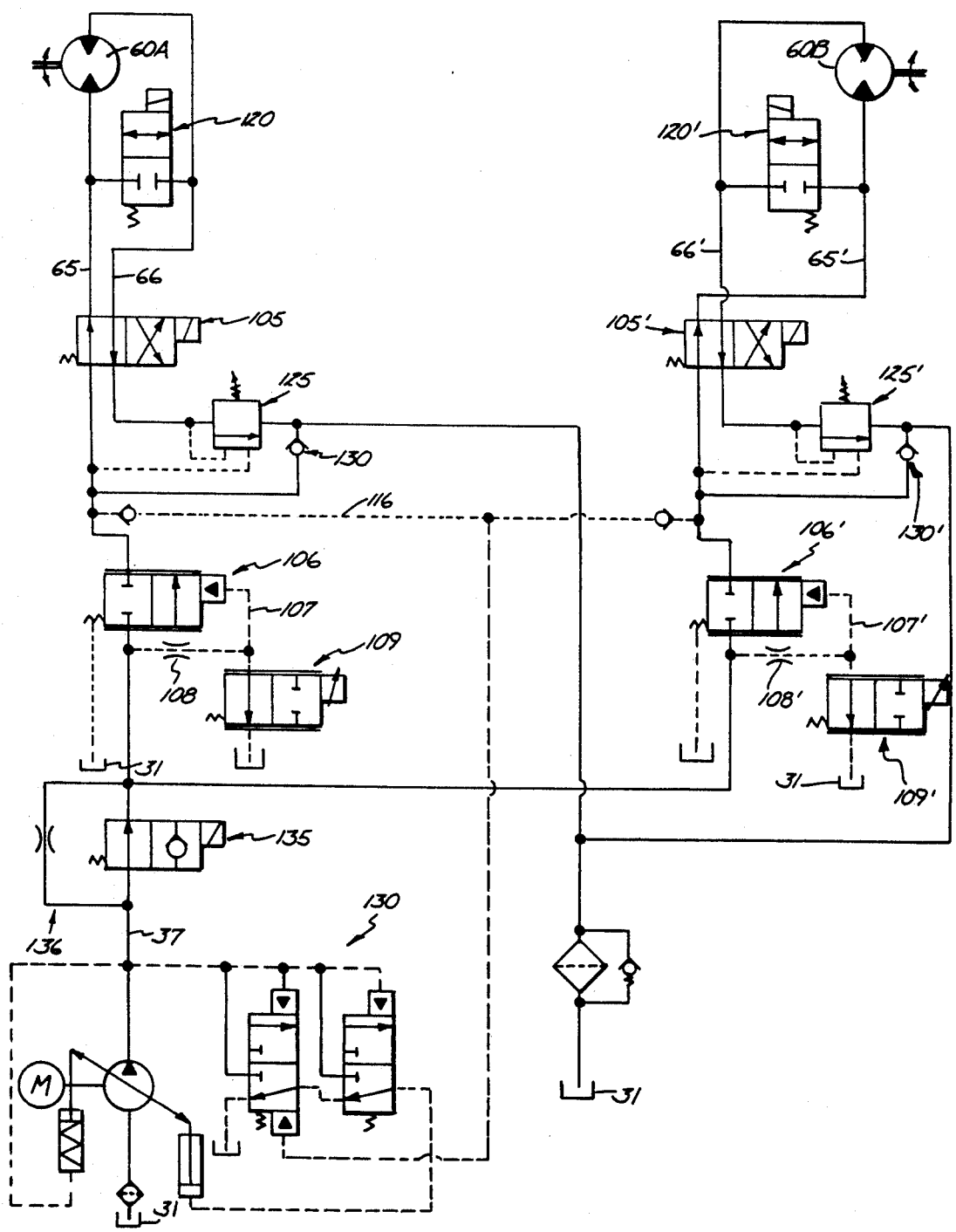
FIG. 4 illustrates a further embodiment of a multiple wheel powering system in accordance with the present invention.

Obviously, many modifications and variations of the present invention are possible in light of the above teachings. FIG. 4 illustrates one such modification in which the dual stage pump system 100 and the valves 35 and 36 of the embodiment of FIG. 3 are replaced with a conventional variable displacement pump having internal flow rate and pressure compensators. The system of FIG. 4 responds to a pressure drop, in a manner similar to that of the embodiment of FIG. 3, to reduce the output from the pump system (indicated generally at 130). As shown in FIG. 4, the output of the pump system 130 is applied to the line 33. A further modification is illustrated in the form of a normally open, solenoid controlled valve 135 having a restricted flow bypass indicated generally at 136. On activation of the valve 135 to the "blocked flow" condition, the flow from the pump system 130 will continue through the restricted flow bypass line 136 resulting in a diminished flow available to the hydraulic circuits associated with the motors 60A and 60B. This diminished flow may be activated by an appropriate control signal and may be analogized to a "downshift" in many known transmission systems. Also, many of the modifications discussed with reference to FIGS. 3 and 4 may be gainfully employed within the embodiment of FIG. 2 while the concepts of all of the Figures may be modified in accordance with the teachings herein. It is therefore to be understood that, within the scope of the appended claims, the invention may be practiced otherwise than as specifically described.

We claim:

1. An apparatus for hydraulically powering a vehicle for human transportation comprising:
   fluid reservoir means;
   electrically driven hydraulic pump means having an input connected to said fluid reservoir means;
   bidirectional hydraulic motor means mechanically connected to power said vehicle;
   hydraulic circuit means connecting said motor means to a supply of fluid pumped from said fluid reservoir means by said pump means, and including;
   means for selectively controlling the direction and rate of fluid flow delivered to said motor means; and
   means for regulating the flow of fluid to said selective control means without altering the supply of fluid pumped by said pump means, said regulating means being responsive to a change of flow rate of fluid delivered to said motor means by said selective control means, such that a portion of the flow of the supply of fluid delivered by said pump means is diverted away from the selective control means to said fluid reservoir means.

2. The vehicle powering system of claim 1 wherein said hydraulic circuit means comprises variable valve means.

3. The vehicle powering system of claim 1 wherein said pump means comprises multiple pumps and means for selectively shunting the output of at least one of said multiple pumps.

4. The vehicle powering system of claim 1 wherein said hydraulic circuit means includes pressure drop responsive means comprising normally closed, variable valve means for diverting a portion of the output of said pump means to said reservoir means.

5. An apparatus for hydraulically powering a vehicle for human transportation, the vehicle being of the type having two drive wheels, comprising:
   electrically driven hydraulic pump means;
   bidirectional hydraulic motor means associated with each drive wheel and mechanically connected to separately power said drive wheels;
   hydraulic circuit means separately connecting each of
   said motor means to a supply of fluid pumped from said fluid reservoir means by said pump means, and including:
   means for selectively controlling the direction of fluid through each of said motor means;
   variable valve means for selectively controlling the flow rate of fluid delivered to said motor means; and
   means for regulating the flow of fluid to said variable valve means without altering the supply of fluid pumped by said pump means, said regulating means being responsive to a change of flow rate of fluid delivered to said motor means by said variable valve means, such that a portion of the flow of the supply of fluid delivered by said pump means is diverted away from the variable valve control means to said fluid reservoir means.

6. The vehicle powering system of claim 5 wherein said hydraulic pump means comprises multiple pump means and means for selectively shunting the output of at least one of said multiple pump means.

7. The vehicle powering system of claim 6 further comprising normally closed valve means associated with at least one of said multiple pump means and responsive to the output pressure at the output of said multiple pump means for shunting the output of that pump means with which it is associated when said multiple pump means output pressure at least equals a preselected value.

8. The vehicle powering system of claim 5 further comprising freewheeling means including normally closed selectively operable valve means connected in parallel with each of said motor means.

9. The vehicle powering system of claim 5 further comprising braking means each associated with a different one of motor means and including normally closed valve means connected to receive the output flow from that motor means with which it is associated and responsive to a preselected pressure in the flow of either the input or output to said associated motor means.

* * * * *

UNITED STATES PATENT AND TRADEMARK OFFICE
CERTIFICATE OF CORRECTION

PATENT NO. : 5,158,150

DATED : October 27, 1992

INVENTOR(S) : STANLEY C. ASKELAND, CONSTANTINE KOSARZECKI

It is certified that error appears in the above-identified patent and that said Letters Patent is hereby corrected as shown below:

Col. 8, line 61, delete "motor", insert "said motor"

Signed and Sealed this

Fifth Day of October, 1993

*Attest:*

BRUCE LEHMAN

*Attesting Officer*     Commissioner of Patents and Trademarks